Dec. 16, 1924. 1,519,404
E. HENDERSON
PIPE JOINT
Filed Jan. 3, 1921  2 Sheets-Sheet 2

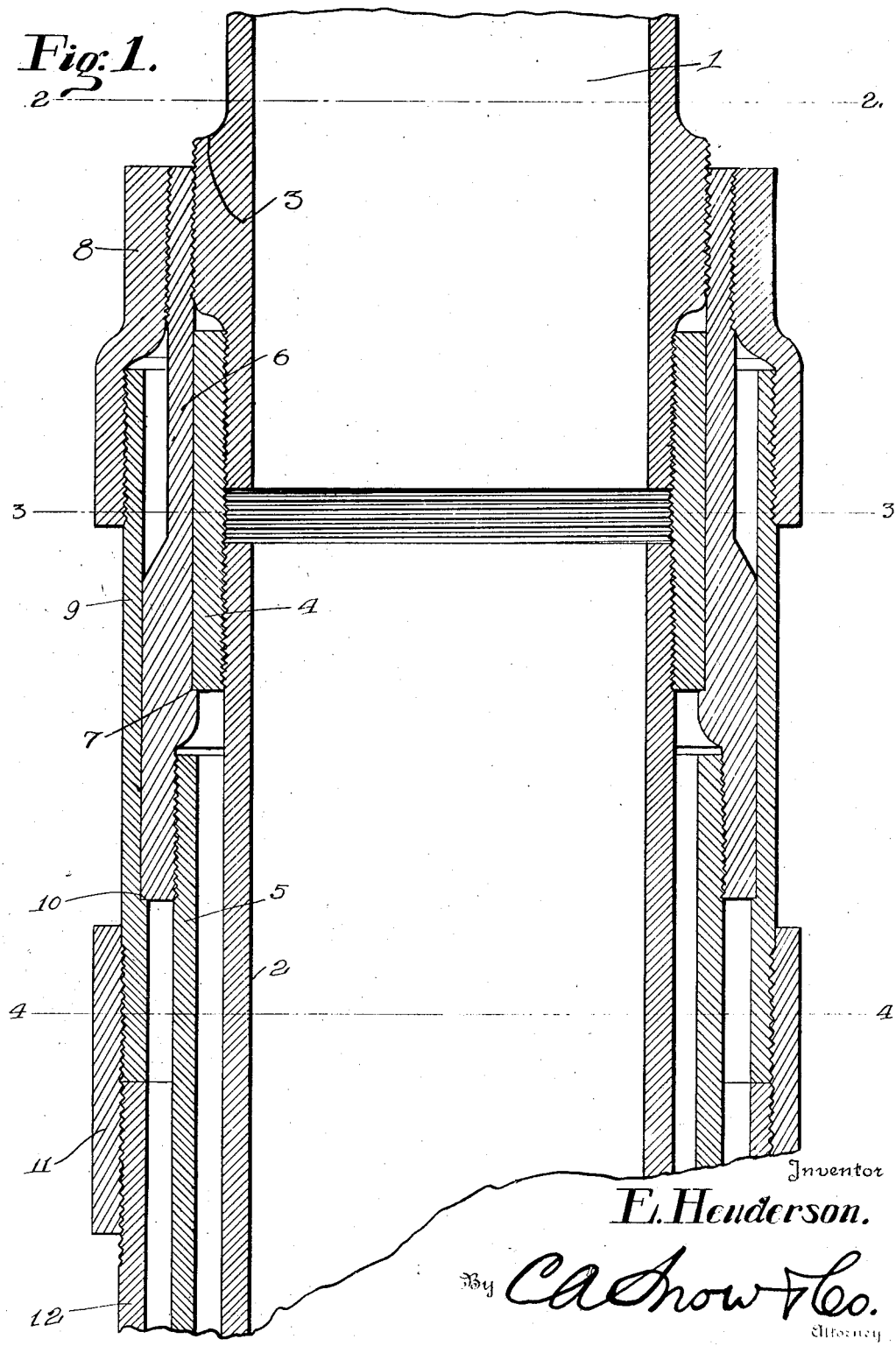

Inventor
E. Henderson.
By C. A. Snow & Co.
Attorney

Patented Dec. 16, 1924.

1,519,404

UNITED STATES PATENT OFFICE.

EDMUND HENDERSON, OF TAMPICO, TAMPS, MEXICO.

PIPE JOINT.

Application filed January 3, 1921. Serial No. 434,597.

*To all whom it may concern:*

Be it known that I, EDMUND HENDERSON, a citizen of the United States, residing at Tampico, in the Province of Tamps and Republic of Mexico, have invented a new and useful Pipe Joint, of which the following is a specification.

It is the object of this invention to provide a simple but efficient means whereby a number of casings may be connected to a string of piping, with a minimum number of joints, leakage being avoided.

In the accompanying drawings:—

Figure 3:
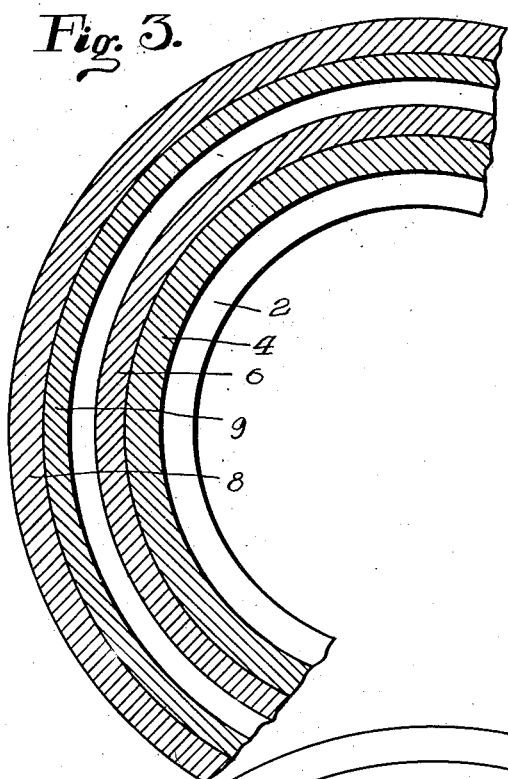
Figure 4:
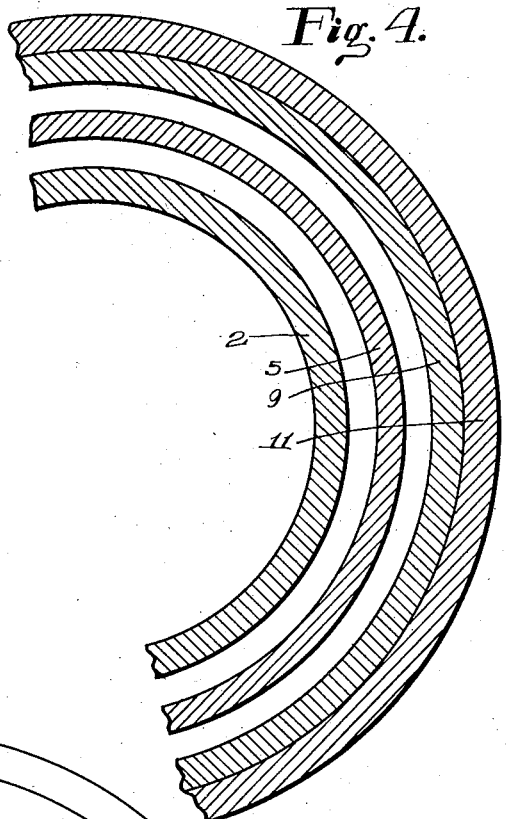
Figure 2:
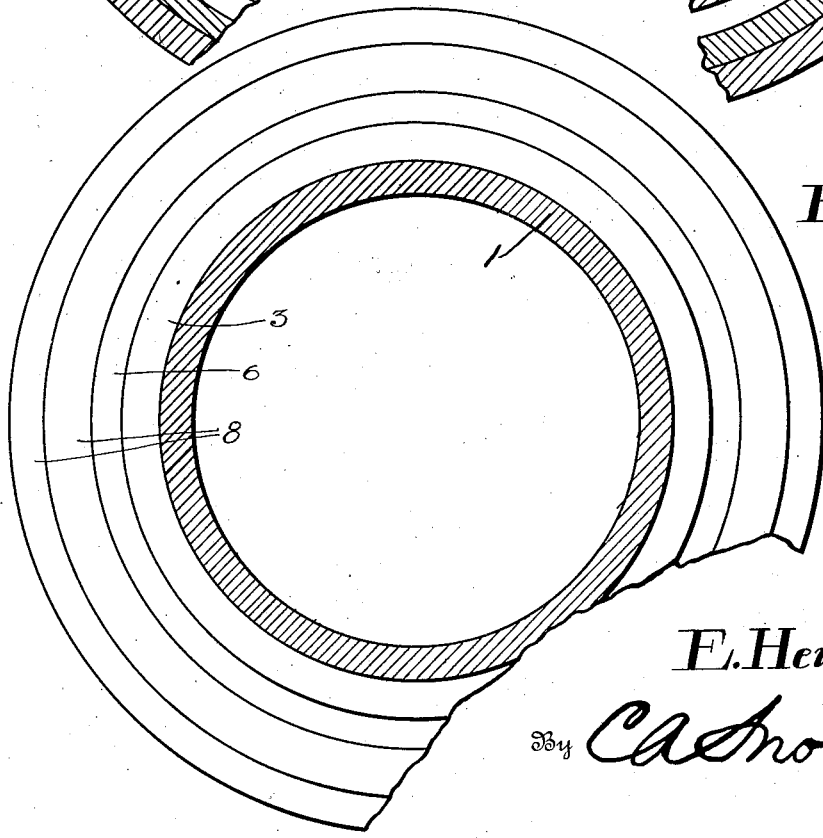

Figure 1 shows in longitudinal section, a device constructed in accordance with the invention; Figure 2 is a section on the line 2—2 of Figure 1, Figure 3 is a section on the line 3—3 of Figure 1; and Figure 4 is a section on the line 4—4 of Figure 1.

The numeral 1 denotes an upper tubular member, the numeral 2 denoting a pipe disposed below the tubular member 1. The tubular member 1 has an outstanding annular rib 3. The tubular member 1 and the pipe 2 are united by an external threaded coupling 4. The numeral 5 designates an inner casing spaced from the pipe 2. A collar 6 surrounds the coupling 4 closely but slidably and is internally threaded at its upper end on the rib 3. The lower end of the collar 6 is offset and is threaded internally on the upper end of the inner casing 5. Intermediate its ends, the collar 6 is supplied with an internal annular shoulder 7 supporting the coupling 4. The numeral 8 denotes a sleeve internally threaded on the upper end of the collar 6. The lower end of the sleeve 8 is offset and is threaded internally on a nipple 9 surrounding the lower end of the collar 6 closely but slidably. The nipple 9 has an internal shoulder 10 whereon the lower end of the collar 6 rests. A threaded coupling 11 connects the lower end of the nipple 9 with an outer casing 12.

The construction of the device is such that a plurality of tubular parts, such as casing, pipings and the like used in well drilling and other operations, may be connected with a minimum number of joints and with a consequent decrease in the possibility of leakage.

Having thus described the invention, what is claimed is:—

1. In a device of the class described, a tubular member having an outstanding rib; a pipe; a coupling connecting the tubular member and the pipe and alined with the rib; a casing spaced from the pipe; and a collar surrounding the coupling and connecting the rib with the casing.

2. A device of the class described, constructed as set forth in claim 1; and further characterized by the fact that the collar is provided with an internal shoulder constituting an abutment for one end of the coupling.

3. A device of the class described, constructed as set forth in claim 1 and further characterized by the provision of a nipple surrounding the collar; a sleeve forming a connection between the nipple and the collar; and a second casing connected to the nipple.

4. In a device of the class described, a tubular member having an outstanding rib; a pipe; a coupling alined with the rib and uniting the tubular member and the pipe; a collar surrounding the coupling and engaged with the rib, the collar having an internal shoulder constituting an abutment for one end of the coupling; an inner casing carried by the collar; a nipple surrounding the collar and provided with an internal shoulder constituting an abutment for the collar; a sleeve constituting a connection between one end of the nipple and the collar; and an outer casing connected to the other end of the nipple.

In testimony that I claim the foregoing as my own, I have hereto affixed my signature.

EDMUND HENDERSON.